United States Patent [19]

Fischer et al.

[11] Patent Number: 4,622,382
[45] Date of Patent: Nov. 11, 1986

[54] UNSATURATED ALCOHOL-MODIFIED POLYESTERS

[75] Inventors: Herbert Fischer, Duesseldorf; Bernd Wegemund, Haan; Manfred Gorzinski, Duesseldorf; Wolfgang Gress, Wuppertal-Elberfeld, all of Fed. Rep. of Germany

[73] Assignee: Henkel Kommanditgesellschaft auf Aktien, Duesseldorf, Fed. Rep. of Germany

[21] Appl. No.: 753,194

[22] Filed: Jul. 9, 1985

[30] Foreign Application Priority Data

Jul. 9, 1984 [DE] Fed. Rep. of Germany ....... 3425183

[51] Int. Cl.⁴ .............................................. C08G 63/54
[52] U.S. Cl. .................................. 528/295.3; 524/601; 528/295.5; 528/296; 528/303; 528/306
[58] Field of Search ................. 528/295.3, 295.5, 296, 528/303, 306; 524/601

[56] References Cited

U.S. PATENT DOCUMENTS

| 3,893,959 | 7/1975 | Layman | 528/295.3 |
| 4,031,047 | 6/1977 | Dhein et al. | 260/21 |
| 4,049,599 | 9/1977 | Lott | 260/22 |
| 4,413,116 | 11/1983 | Reuter et al. | 528/295.3 X |
| 4,474,941 | 10/1984 | Wilk et al. | 528/295.5 X |
| 4,517,334 | 5/1985 | Wilk et al. | 524/601 X |

*Primary Examiner*—Lucille M. Phynes
*Attorney, Agent, or Firm*—Ernest G. Szoke; Henry E. Millson, Jr.; Mark A. Greenfield

[57] ABSTRACT

An unsaturated polyester, preferably having a stellate molecular structure, with a polyol center and monohydric alcohol connected to the polyol hydroxy moieties through a di- or tri- carboxylic acid link, as well as a process for its synthesis, and use of the compounds in air-drying lacquer binders.

33 Claims, No Drawings

UNSATURATED ALCOHOL-MODIFIED POLYESTERS

BACKGROUND OF THE INVENTION

1. Field of the Invention

This invention relates to an air-drying unsaturated alcohol-modified polyester which, by virtue of its low viscosity, may be made up into solvent-free or at least substantially solvent-free lacquer binders.

2. Statement of the Related Art

Lacquers are normally applied by spray coating, spread coating or dip coating. In this connection, it is important that their viscosity should not exceed a certain maximum to guarantee good levelling and complete wetting. Normally, the viscosity is adjusted by the addition of solvents or diluents. However, solvents and diluents are troublesome during processing and pollute the environment by evaporation, so that there have been several attempts to restrict their use at least in quantitative terms. In the field of oven-drying in lacquers, it is proposed in U.S. Pat. No. 4,031,047 and corresponding German published patent application No. 25 05 246 to replace part of the solvent by a constituent capable of polymeric condensation, namely caprolactam. U.S. Pat. No. 4,049,599 proposes for oven-drying lacquers a low viscosity, relatively low molecular weight polyester based on fatty acids, polyols and polybasic carboxylic acids.

However, it has not yet been possible to apply the two solutions mentioned above to air-drying systems. The air drying of alkyd resins is a comparatively slow crosslinking reaction which leads more quickly to hard coatings, the higher the starting molecular weight of the resin. However, the viscosity of the resin solutions and, therefore, the quantity of solvent/diluent required to obtain processible preparations increases with increasing molecular weight.

SUMMARY OF THE INVENTION

The present invention remedies the above problems and provides a highly branched, highly unsaturated polyester of low viscosity which has the drying rates expected of an air-drying alkyd resin. This invention also provides a process for producing polyesters such as these as well as the polyesters per se, and teaches their use in air-drying high-solid or full-solid lacquers.

Accordingly, the present invention relates to unsaturated, low-viscosity polyesters modified by monohydric alcohols, characterized in that they comprise at least one olefinically unsaturated monohydric alcohol which is attached by at least one di- and/or tri-carboxylic acid to the OH-functions of at least one polyol having an average functionality of greater than 2.

The polyesters according to the invention are highly branched and preferably have a stellate molecular structure in which the central part of the molecule is derived from a polyol containing on average at least 2 OH-moieties. Unsaturated monohydric alcohols are attached to the individual OH-moieties of the polyol through polybasic carboxylic acids. If dicarboxylic acids are used as the polybasic carboxylic acids, up to one unsaturated monohydric alcohol per hydroxyl moiety of the polyol may be introduced into the polyester molecule. Where tricarboxylic acids are used, it is possible to introduce up to 2 mols of unsaturated monohydric alcohol per hydroxyl moiety of the polyol.

In another embodiment, the present invention relates to branched unsaturated polyesters in which one or more hydroxyl moieties of the central polyol is/are not reacted. In either case, however, at least three unsaturated alcohol residues should be present on average per molecule of polyester, because otherwise the drying times of the lacquer binder become longer.

According to the invention, it is also possible to condense two or more such stellate polyester molecules to one another through dicarboxylic or tricarboxylic acid bridges. However, one should not join any more than ten and, more particularly, any more than five polyester molecules to one another because this would result in the formation of resins of too high a viscosity.

In practical terms, these observations on molecular structure mean that from 0.7 to 1, preferably 0.75 to 1, mol of dicarboxylic or tricarboxylic acids should be used per mol of OH-moieties of the central polyol, from 0.8 to 1 mol being most preferred. The quantity of unsaturated monohydric alcohols should be selected in such a way that 80 to 100%, preferably 90 to 100%, of the carboxylic acid groups which are not attached to the central polyol can be esterified therewith.

The compound(s) of this invention may thus be summarized as: An unsaturated polyester comprising:

a central portion comprising the esterification residue of a polyol having from an average of more than 2 up to 25 polyol hydroxy moieties;

an esterification residue of at least one di- or tri-carboxylic acid which has an esterification link to at least 70% of the above polyol hydroxy moieties through one of the at least one acids' carboxylic moieties; and an esterification residue of at least one monohydric, olefinically unsaturated, $C_{12-22}$ alcohol which has an esterification link to at least 80% of the remaining carboxylic acid moieties of the above acid residue through the alcohol's sole hydroxy moiety.

As used herein, "esterification residue" is understood to mean that portion of an alcohol, polyol, or acid, which remains after it has undergone esterification. As used herein, "esterification link" is understood to mean the molecular structure that is formed between a hydroxy moiety and a carboxyl moiety upon esterification, regardless of whether one reactant is an acid per se, or its equivalent anhydride, ester, or acid chloride.

DETAILED DESCRIPTION OF THE INVENTION

Other than in the operating examples, or where otherwise indicated, all numbers expressing quantities of ingredients, reaction conditions, or defining ingredient parameters used herein are to be understood as modified in all instances by the term "about".

A number of compounds may be used as the central polyols. The only absolute requirement is that on average, more than 2 hydroxyl moieties should be present. In particular, the polyol should contain, on average, more than 2 and less than 25, preferably 3 to 10, more preferably 3 to 6, most preferably 4 to 6, OH moieties.

Particularly suitable polyols contain from 3 to 6 hydroxyl moieties and up to 6 carbon atoms. Examples of such include glycerol, trimethylol ethane, trimethylol propane, or pentaerythritol. Another group of suitable polyols are the condensation products of the above-mentioned polyols with one another which contain in all up to 18 carbon atoms and up to 3 ether oxygen atoms. Thus, it is possible to use the dimer or trimer condensation products of diglycerol, triglycerol, trimethylol ethane, trimethylol propane and/or pentaerythritol containing 2 or 3 ether oxygen atoms. Dimers of the above first mentioned polyols are particularly preferred. Generally preferred co-condensed polyols are diglycerol, triglycerol, ditrimethyol propane, di-trimethylol ethane, and/or dipentaerythritol.

In many cases, it has proven to be favorable to subject the polyols to a chain-extending reaction. To that end, the compounds may be reacted with up to 2 mols of ethylene oxide or, preferably, propylene oxide per mol of hydroxyl moieties. Another group of suitable polyhydric alcohols are the sugar alcohols, such as sorbitol or mannitol. It is also possible to use their condensation products with internal elimination of water, for example sorbitan. Finally, shortchain oligomers obtained by telomerization, for example low molecular weight polyvinyl alcohol, may be used as the polyols.

According to the invention, dicarboxylic and/or tricarboxylic acids are used for joining the polyols to the unsaturated monofunctional alcohols. Unsaturated aliphatic and/or cycloaliphatic di- and/or tricarboxylic acids containing from 4 to 10 carbon atoms are preferably used for that purpose. Thus, it is possible to use maleic acid, fumaric acid, tetrahydrophthalic acid and/or substituted tetrahydrophthalic acids such as methyl or ethyl. In either case, it is preferred to use acids which form cyclic anhydrides because reactive derivatives, such as anhydrides, esters or acid chlorides are preferably used instead of the acids themselves. Instead of using unsaturated di- and/or tricarboxylic acids, it is also possible to use saturated aliphatic and/or cycloaliphatic di- and/or tricarboxylic acids containing from 3 to 10 carbon atoms. Thus, it is possible to use glutaric acid, succinic acid, adipic acid, sebacic acid, hexahydrophthalic acid and isomers thereof or even citric acid, butane tetracarboxylic acid or cyclohexane tricarboxylic acid, or the reactive derivatives of any of the foregoing acids. This also applies to the aromatic di- and/or tricarboxylic acids containing from 8 to 14 carbon atoms which may also be used in accordance with the invention. In addition to the isomeric phthalic acids, trimellitic acids are also suitable. Thus, trimellitic acid anhydride is a particularly favorable starting material. If a compound is desired which will yield particularly short drying times when included in lacquers, unsaturated dicarboxylic and/or tricarboxylic acids are primarily used. If it is desired to obtain a compound which will yield relatively long drying times when included in a lacquer, it is advisable to use the saturated compounds. In this connection, the use of aromatic acid derived compounds provides the lacquers with greater final hardness. Generally preferred acids are moleic, tetrahydrophthalic, methyl tetrahydrophthalic, phthalic, hexahydrophthalic, itaconic, glutaric, an ester, acid chloride, or anhydride of any of the foregoing, or a mixture thereof.

According to the invention, unsaturated monohydric alcohols are attached to the central polyols through the above-mentioned polybasic carboxylic acids. Suitable monohydric alcohols are both linear and branched primary alcohols preferably containing 12 to 22, more preferably 16 to 18, carbon atoms. Particularly preferred monofunctional and saturated alcohols are unsaturated fatty alcohol mixtures. Fatty alcohols are the hydrogenation products of naturally occurring fatty acids. The alcohols in question are primary monohydric alcohols with an even number of carbon atoms which contain the double bonds present in the starting fatty acid. Unsaturated fatty alcohols are produced from fatty acid mixtures which consist partly or predominantly of fatty acids containing 14, 16, 18, 20 and 22 carbon atoms and from 1 to 3 double bonds. Fatty alcohol mixtures particularly preferred for the purposes of the invention have an average iodine number of 90 to 200, preferably 130 to 180, and more preferably, 150 to 170. Important constituents of unsaturated fatty alcohol mixtures of the type in question are oleyl alcohol, linoleyl alcohol, erucic alcohol and palmitoleyl alcohol.

Synthesis of the Invention Compounds

To produce the unsaturated polyesters according to the invention, it is best to start out from the di- and/or tricarboxylic acids, their esters and, preferably, their anhydrides and to react them with the unsaturated monohydric alcohols in known manner in a first step, to form partial esters. The partial esters are then esterified further with the polyols in a second step which may be carried out in the presence of acidic catalysts and/or lead or tin salts or other standard esterification catalysts. A substantially involatile solvent, such as toluene or xylene, may be present for azeotropically removing the water from the circuit or, alternatively, the water of reaction may be removed in a stream of nitrogen.

It is also possible, although less preferred, to start out from the polyols and to react them with the anhydides of the di- and/or tri- carboxylic acids, for example with trimellitic acid anhydride, to form polybasic carboxylic acids which are then esterified with the unsaturated monohydric alcohols.

In one preferred embodiment of the invention, the dicarboxylic and/or tricarboxylic acids are reacted with the unsaturated monohydric alcohols in such a way that one carboxyl moiety is still present per molecule. The semiesters thus produced are preferably esterified stoichiometrically with the polyols. If it is desired to bridge two or more unsaturated polyester molecules using a dicarboxylic acid, it is advisable to prepare a preliminary product in which one hydroxyl moiety of the polyol reacted with the semiester is still free and to dimerize that preliminary product by esterification with a dicarboxylic acid in a molar ratio of 2:1. According to the invention, it is also possible to produce products containing residual carboxyl moieties by using the polyol in a slight excess to produce unsaturated polyesters containing a residual excess of hydroxyl moieties, or by using the monohydric alcohols in a substoichiometric quantity.

Uses of the Invention Compounds

The unsaturated polyesters according to the invention may be used for the production of air-drying alkyd resin lacquers. To that end, the usual known auxiliaries such as siccatives, fillers, pigments, anti-skinning agents, pigment dispersants and the like, are added to the unsaturated polyesters according to the invention. Exemplary auxiliaries will be found in the examples which follow although these are not intended as limiting. The antiskinning agents are generally ketoximes, with methyl ketoxime being preferred. Pigments besides those disclosed in the examples include organics such as phthalocyanine blue and phthalocyanine green, as well as inorganics such as chromium oxide, chrome yellow, and molybdate red.

Lacquers produced with the unsaturated polyesters according to the invention have such low viscosities without dilution with organic solvents that they may be processed by themselves. For certain applications, however, a further reduction in viscosity is desirable and may be obtained by the addition of preferably 5 to 10% by weight of standard solvents or solvent mixtures It is only in exceptional cases that quantities of solvent of 5–25% by weight are necessary. It is of course possible to use even larger quantities of solvent, although there is no advantage in doing so. If desired, the solvents may even be completely or partly replaced by reactive diluents. Examples of reactive diluents are esters of unsaturated carboxylic acids with monohydric or polyhydric alcohols, particularly acrylates or methacrylates.

EXAMPLES

1. Synthesis of Inventive Compound

The following constituents were introduced into a 2 liter laboratory apparatus equipped with a stirrer, condenser, water separator and thermometer:

504 g of a $C_{16-18}$ unsaturated fatty alcohol mixture, iodine number 150 to 170, OH number 223 (HD-"Ocenol"—a trademark of Henkel KGaA, F.R. Germany)

304 g of tetrahydrophthalic acid anhydride 100 ml of xylene (to remove the water of reaction).

The above constituents were left reacting for 3 hours at 100° to 120° C., followed by the addition of 125 g of ditrimethylol propane and 2.8 g of tin powder. The solvent was distilled off and, from the point onward, water of reaction was removed in a stream of nitrogen. To that end, the reaction mixture was heated to at most about 240° C. and condensed until 38 ml of condensate had collected. The acid number had fallen below 5. Approx. 0.5 kg of a low viscosity unsaturated polyester was obtained.

2. Synthesis of Inventive Compound

The procedure was as in Example 1, except that 105.4 g of dipentaerythritol were used instead of 150 g of ditrimethylol propane.

3. Production of Lacquers

The resins of Examples 1 and 2 were made up into clear lacquers. To that end, the following constituents were mixed by stirring:

50 g of resin 0.2 g of drying accelerator (organic cobalt salt, 6% by weight of cobalt, manufacturer: Messrs. Borchers, Goslar)

1.25 g of drying accelerator (organic zirconium salt, 6% by weight Zr, manufacturer: Messrs. Borchers, Goslar)

1.0 g of antiskinning agent, specifically a Ketoxime ("Dehydril" NRC—a trademark of Henkel KGaA F.R. Germany)

4. Production of Lacquer

The unsaturated polyester of Example 1 was made up into a white lacquer. To that end, a ground paste was initially prepared from 20 g of the unsaturated polyester of Example 1

0.5 g of drying accelerator (calcium salt, of 2-ethylhexanoic acid 4% by weight of calcium, manufacturer: Messrs. Borchers, Goslar)

40 g of titanium dioxide pigment ("Kronos" CL 310 - a trademark of Kronos Titan, Leverkusen, Germany.

The above-mentioned constituents were ground for 5 minutes at 15 to 20,000 r.p.m. in a disperser. The dispersion obtained was made into a lacquer by the addition of:

30 g of unsaturated polyester 0.2 g of drying accelerator based on Co as in Example 4

1.25 g of drying accelerator based on Zr as in Example 4

1.0 g of antiskinning agent (Dehydril NRC).

5. Utility Testing

To test drying behavior, lacquer films were drawn onto glass plates and their hardness measured by the Koenig pendulum method, German Industrial Norm (DIN) 53,157. In every case, gloss, (angle 60°) was greater than 90%.

| Lacquer | Koenig pendulum hardness (DIN 53,157) as measured after | | |
|---|---|---|---|
| | 1 day | 7 days | 14 days |
| Clear lacquer (resin of Example 1) | 14 | 22 | 60 |
| Clear lacquer (resin of Example 2) | 11 | 38 | 62 |
| White lacquer (Example 5) | 14 | 39 | 70 |

We claim:

1. An unsaturated polyester consisting essentially of:
a central portion consisting essentially of the esterification residue of a polyol having from an average of more than 2 up to 25 polyol hydroxy moieties;
an esterification residue of at least one di- or tri- carboxylic acid which has an esterification link to at least 70% of said polyol hydroxy moieties through one of said acid's carboxylic moieties; and
an esterification residue of at least one monohydric, olefinically unsaturated, $C_{12-22}$ alcohol which has an esterification link to at least 80% of the remaining carboxylic acid moieties of said acid residue through its sole hydroxy moiety.

2. The polyester of claim 1 wherein said polyol is selected from:
a $C_{1-6}$ polyol with 3–6 hydroxy moieties;
a dimer or trimer condensation product of the foregoing having up to 3 ether oxygen atoms and up to 18 carbon atoms;
an ethoxylation product of any of the foregoing with up to 2 mols of ethylene oxide or propylene oxide per mol of hydroxyl moiety;
a sugar alcohol or its condensation product with internal elimination of water; or
a short chain polyol oligomer obtained by telomerization.

3. The polyester of claim 1 wherein said polyol is selected from: glycerol, trimethylol ethane, trimethylol propane, pentaerythritol; a dimer or trimer of the foregoing containing 2 or 3 ether oxygen atoms; an ethoxylation product of any of the foregoing with up to 2 mols of ethylene oxide or propylene oxide per mol of hydroxyl moiety; sorbitol, mannitol, sorbitan, or low molecular weight polyvinyl alcohol.

4. The polyester of claim 1 wherein said polyol is diglycerol, triglycerol, ditrimethylol propane, ditrimethylol ethane, or dipentaerythritol.

5. The polyester of claim 1 wherein said polyol is ditrimethylol propane or dipentaerythritol.

6. The polyester of claim 1 wherein said polyol has 3 to 10 hydroxyl moieties.

7. The polyester of claim 1 wherein said polyol has 3 to 6 hydroxyl moieties.

8. The polyester of claim 1 wherein said polyol has 4 to 6 hydroxyl moieties.

9. The polyester of claim 1 wherein said at least one di- or tri- carboxylic acid is selected from:
$C_{4-10}$- unsaturated aliphatic or cycloaliphatic;
$C_{3-10}$- saturated aliphatic or cycloaliphatic;
$C_{8-14}$- aromatic;
an ester, acid chloride, or anhydride of any of the foregoing; or
any mixture of the above.

10. The polyester of claim 1 wherein said at least one di- or tri- carboxylic acid is selected from: maleic, fumaric, tetrahydrophthalic, substituted tetrahydrophthalic, glutaric, succinic, adipic, sebacic, hexahydrophthalic and its isomers, citric, butane tetracarboxylic, cyclohexane tricarboxylic, phthalic and its isomers, trimellitic; an ester, acid chloride, or anhydride of any of the foregoing; or any mixture of the preceding.

11. The polyester of claim 1 wherein said at least one di- or tri- carboxylic acid is maleic, tetrahydrophthalic, methyl tetrahydrophthalic, phthalic, hexahydrophthalic, itaconic, glutaric; an ester, acid chloride, or anhydride of any of the foregoing; or any mixture thereof.

12. The polyester of claim 1 wherein said at least one di- or tri- carboxylic acid is tetrahydrophthalic acid anhydride or phthalic acid anhydride.

13. The polyester of claim 1 wherein said at least one monohydric, olefinically unsaturated, $C_{12-22}$ -alcohol is an unsaturated fatty alcohol mixture.

14. The polyester of claim 1 wherein said at least one alcohol has 14 to 22 carbon atoms and from 1 to 3 double bonds.

15. The polyester of claim 1 wherein said at least one alcohol is a mixture of $C_{14-22}$ fatty alcohols having 1 to 3 double bonds and an average iodine number of about 90 to 200.

16. The polyester of claim 15 wherein said average iodine number is about 130 to 180.

17. The polyester of claim 15 wherein said average iodine number is about 150 to 170.

18. The polyester of claim 1 wherein said at least one alcohol is a $C_{16-18}$ -unsaturated fatty alcohol mixture with an average iodine number of about 150 to 170.

19. The polyester of claim 2 wherein said at least one acid is selected from:
$C_{4-10}$ -unsaturated aliphatic or cycloaliphatic;
$C_{3-10}$ -saturated aliphatic or cycloaliphatic;
$C_{8-14}$ -aromatic;
an ester, acid chloride, or anhydride of any of the foregoing; or
any mixture of the above, and said at least one alcohol has 14 to 22 carbon atoms, an iodine number of about 90 to 200, and from 1 to 3 double bonds, or is a mixture thereof.

20. The polyester of claim 3 wherein said at least one acid is selected from: maleic, fumaric, tetrahydrophthalic, substituted tetrahydrophthalic, glutaric, succinic, adipic, sebacic, hexahydrophthalic and its isomers, citric, butane tetracarboxylic, cyclohexane tricarboxylic, phthalic and its isomers, trimellitic; an ester, acid chloride, or anhydride of any of the foregoing; or any mixture of the preceding; and said at least one alcohol has 14 to 22 carbon atoms an iodine number of about 130 to 180, and from 1 to 3 double bonds or is a mixture thereof.

21. The polyester of claim 4 wherein said at least one acid is maleic, tetrahydrophthalic, methyl tetrahydrophthalic, phthalic, hexahydrophthalic, itaconic, glutaric; an ester, acid chloride, or anhydride of any of the foregoing, or any mixture thereof; and said at least one alcohol has 14 to 22 carbon atoms an iodine number of about 150 to 170, and from 1 to 3 double bonds, or is a mixture thereof.

22. The polyester of claim 5 wherein said at least one acid is tetrahydrophthalic acid anhydride or phthalic acid anhydride; and said at least one alcohol is a $C_{16-18}$ unsaturated fatty alcohol mixture with an average iodine number of about 150 to 170.

23. The polyester of claim 1 wherein said polyester has a stellate molecular structure.

24. In an air drying lacquer binder containing a polyester and known drying accelerators, anti-skinning agents, optional pigments and pigment dispersants, and 0 to 25% w/w of organic solvents and/or reactive diluents, the improvement wherein said polyester consists essentially of
a central portion consisting essentially of the esterification residue of a polyol having from an average of more than 2 up to 25 polyol hydroxy moieties;
an esterification residue of at least one di- or tri-carboxylic acid which has an esterification link to at least 70% of said polyol hydroxy moieties through one of said acids carboxylic moieties; and
an esterification residue of at least one monohydric, olefinically unsaturated, $C_{12-22}$ alcohol which has an esterification link to at least 80% of the remaining carboxylic acid moieties of said acid residue through its sole hydroxy moiety.

25. The binder of claim 24 wherein said polyol is selected from:
a $C_{1-6}$ polyol with 3-6 hydroxy moieties;
a dimer or trimer condensation product of the foregoing having up to 3 ether oxygen atoms and up to 18 carbon atoms;
an ethoxylation product of any of the foregoing with up to 2 mols of ethylene oxide or propylene oxide per mol of hydroxyl moiety;
a sugar alcohol or its condensation product with internal elimination of water; or
a short-chain polyol oligomer obtained by telomerization.

26. The binder of claim 24 wherein said polyol is selected from: glycerol, trimethylol ethane, trimethylol propane, pentaerythritol; a dimer or trimer of the foregoing containing 2 or 3 ether oxygen atoms; an ethoxylation product of any of the foregoing with up to 2 mols of ethylene oxide or propylene oxide per mol of hydroxyl moiety; sorbitol, mannitol, sorbitan, or low molecular weight polyvinyl alcohol.

27. The binder of claim 24 wherein said polyol is diglycerol, triglycerol, ditrimethylol propane, ditrimethylol ethane, or dipentaerythritol.

28. The binder of claim 24 wherein said polyol is ditrimethylol propane or dipentaerythritol.

29. The binder of claim 25 wherein said at least one acid is selected from:
$C_{4-10}$ -unsaturated aliphatic or cycloaliphatic;
$C_{3-10}$ -saturated aliphatic or cycloaliphatic;
$C_{8-14}$ -aromatic;
an ester, acid chloride, or anhydride of any of the foregoing; or
any mixture of the above, and said at least one alcohol has 14 to 22 carbon atoms, an iodine number of about 90 to 200, and from 1 to 3 double bonds, or is a mixture thereof.

30. The binder of claim 26 wherein said at least one acid is selected from: maleic, fumaric, tetrahydrophthalic, substituted tetrahydrophthalic, glutaric, succinic, adipic, sebacic, hexahydrophthalic and its isomers, citric, butane tetracarboxylic, cyclohexane tricarboxylic, phthalic and its isomers, trimellitic; an ester, acid chloride, or anhydride of any of the foregoing; or any mixture of the preceding; and said at least one alcohol has 14 to 22 carbon atoms an iodine number of about 130 to 180, and from 1 to 3 double bonds or is a mixture thereof.

31. The binder of claim 27 wherein said at least one acid is maleic, tetrahydrophthalic, methyl tetrahydrophthalic, phthalic, hexahydrophthalic, itaconic, glutaric; an ester, acid chloride, or anhydride of any of the foregoing, or any mixture thereof; and said at least one alcohol has 14 to 22 carbon atoms an iodine number of about 150 to 170, and from 1 to 3 double bonds, or is a mixture thereof.

32. The binder of claim 28 wherein said at least one acid is tetrahydrophthalic acid anhydride or phthalic acid anhydride; and said at least one alcohol is a $C_{16-18}$ unsaturated fatty alcohol mixture with an average iodine number of about 150 to 170.

33. A process for synthesizing the polyester of claim 1 wherein said at least one di - or tri- carboxylic acid is first reacted with said at least one monohydric alcohol to form a partial ester containing at least one free carboxylic moiety, and said partial ester is then reacted with said polyol to form the completed polyester.

* * * * *